United States Patent
Lee (10) Patent No.: US 10,265,786 B2
(45) Date of Patent: Apr. 23, 2019

(54) METHODS AND APPARATUS FOR CUTTING PROFILES

(71) Applicant: Seoul Laser Dieboard System Co., Ltd., San Diego, CA (US)

(72) Inventor: Sang Moo Lee, Kyong-gi Do (KR)

(73) Assignee: SEOUL LASER DIEBOARD SYSTEM CO., LTD., Foothill Ranch, CA (US)

( * ) Notice: Subject to any disclaimer, the term of this patent is extended or adjusted under 35 U.S.C. 154(b) by 0 days.

(21) Appl. No.: 15/169,552

(22) Filed: May 31, 2016

(65) Prior Publication Data

US 2016/0271708 A1    Sep. 22, 2016

Related U.S. Application Data

(63) Continuation of application No. 13/133,133, filed as application No. PCT/US2008/082371 on Nov. 4, 2008, now abandoned.

(30) Foreign Application Priority Data

Nov. 6, 2007  (KR) .................. 10-2007-0112810

(51) Int. Cl.
   *B21D 28/02*    (2006.01)
   *B23D 15/00*    (2006.01)
   (Continued)

(52) U.S. Cl.
   CPC ............ *B23D 15/002* (2013.01); *B21D 11/08* (2013.01); *B21D 28/02* (2013.01); *B23D 23/00* (2013.01);
   (Continued)

(58) Field of Classification Search
   CPC .... B21D 28/243; B21D 15/002; B21D 53/74; B21D 28/02; B21D 28/00; E06B 3/67313; B26F 1/12; B26D 3/14
   (Continued)

(56) References Cited

U.S. PATENT DOCUMENTS 1,836,354 A * 12/1931 Abrams ................. B21D 53/74
                                                          160/405
2,219,595 A * 10/1940 Lang .................... B21D 11/203
                                                          228/142
(Continued)

FOREIGN PATENT DOCUMENTS

DE        3319797 A1    6/1984
DE        29703849 U1   7/1998
(Continued)

OTHER PUBLICATIONS

Machine translation of Korean application 10-2006-0077083.*
(Continued)

*Primary Examiner* — Pradeep C Battula
(74) *Attorney, Agent, or Firm* — Procopio, Cory, Hargreaves & Savitch LLP (57) ABSTRACT

An apparatus for cutting a profile, including: a cutter configured to make cuts on the profile having a first surface and a second surface, and having at least one rib on the first surface, wherein the cuts are made on the first surface of the profile; a first drive unit to drive the cutter forward and backward to and from the first surface of the profile; and a second drive unit to drive the cutter up and down along the first surface of the profile.

5 Claims, 11 Drawing Sheets

(51) Int. Cl.
  B21D 11/08 (2006.01)
  B23D 23/00 (2006.01)
  B21D 28/24 (2006.01)

(52) U.S. Cl.
  CPC ......... *B21D 28/243* (2013.01); *Y10T 83/0524* (2015.04); *Y10T 83/162* (2015.04); *Y10T 83/8736* (2015.04)

(58) Field of Classification Search
  USPC .......................................................... 83/917
  See application file for complete search history.

(56) References Cited

U.S. PATENT DOCUMENTS

| | | | | |
|---|---|---|---|---|
| 3,065,657 | A * | 11/1962 | Thompson | B23D 21/02 83/917 |
| 3,296,991 | A * | 1/1967 | Rawson | B21D 53/74 72/335 |
| 4,269,255 | A * | 5/1981 | Nailor | A62C 2/12 160/1 |
| 5,231,862 | A * | 8/1993 | Ashley | A47B 55/00 29/897.312 |
| 5,313,761 | A * | 5/1994 | Leopold | E06B 3/667 52/456 |
| 5,361,476 | A * | 11/1994 | Leopold | B21D 53/74 156/109 |
| 5,598,737 | A * | 2/1997 | Oide | B21D 5/0209 30/180 |
| 5,799,557 | A | 9/1998 | Wang | |
| 6,360,420 | B2 * | 3/2002 | Shah | E06B 3/67313 29/428 |
| 6,422,052 | B2 | 7/2002 | Park | |
| 7,147,595 | B1 | 12/2006 | Chen | |
| 7,225,725 | B2 | 6/2007 | Nicaise | |
| 7,448,246 | B2 * | 11/2008 | Briese | B21D 5/08 72/177 |
| 7,546,793 | B2 * | 6/2009 | LaSusa | B23P 15/00 83/917 |
| 8,793,850 | B2 | 8/2014 | Tubach | |
| 2004/0231277 | A1 | 11/2004 | Rosskamp | |
| 2005/0005746 | A1 | 1/2005 | Linenberger | |
| 2008/0134744 | A1 | 6/2008 | Tubach | |
| 2015/0224555 | A1 * | 8/2015 | Lim | B21D 11/08 72/324 |

FOREIGN PATENT DOCUMENTS

| | | |
|---|---|---|
| FR | 822442 A | 3/1960 |
| JP | 07-251387 | 10/1995 |
| JP | 8-30050 A | 11/1996 |
| JP | 2002-178040 A | 6/2002 |
| KR | 1002333350000 B1 | 12/1999 |
| KR | 10-2003-0043131 | 6/2003 |
| KR | 1003888890000 B1 | 6/2003 |
| KR | 10-2006-0077083 A | 8/2006 |
| WO | 2007133550 A2 | 11/2007 |
| WO | 2008135454 A1 | 11/2008 |

OTHER PUBLICATIONS

International Search Report and Written Opinion dated Jun. 4, 2009 from International Application No. PCT/US2008/082371, in 10 pages.

Extended European Search report for EP 088471693, issued by the European Patent Office, dated Mar. 16, 2016.

* cited by examiner

METHODS AND APPARATUS FOR CUTTING PROFILES

CROSS-REFERENCE TO RELATED APPLICATIONS

This application is a continuation application of co-pending U.S. patent application Ser. No. 13/133,133, filed Jan. 10, 2012, which is a 371 application of PCT/US08/82371, filed Nov. 4, 2008, which claimed the benefit of priority of Korean Patent Application No. 10-2007-112810, filed Nov. 6, 2007. The disclosures of the above-referenced patent applications are incorporated herein by reference.

BACKGROUND

Field of the Invention

The present invention relates to methods and apparatus for cutting profiles.

Background

Figure 1:
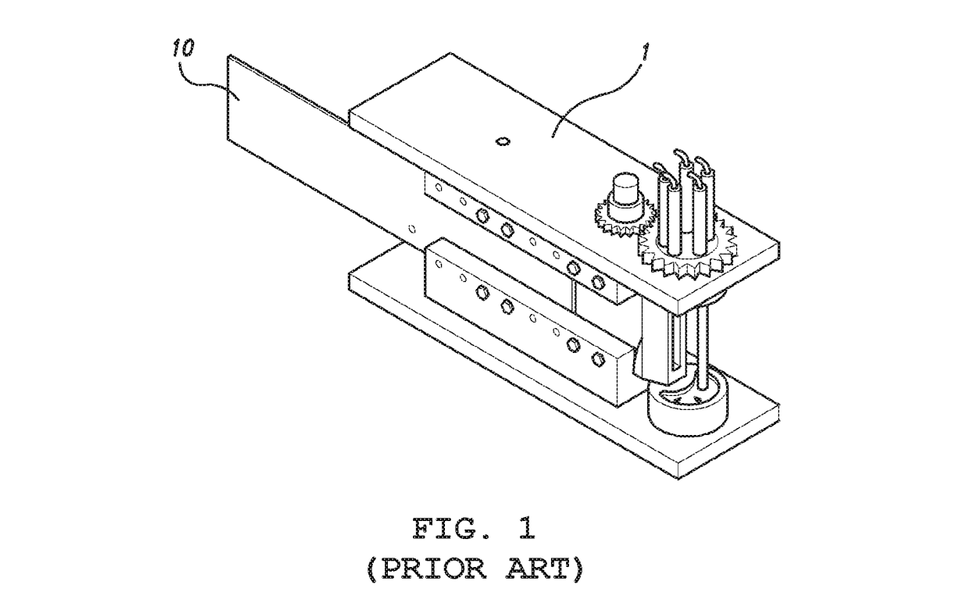
FIG. 1 is a perspective view illustrating a conventional folding machine.

FIG. 1 shows a conventional machine 1 for folding a metal strip or rule 10 of a flat type into a predetermined shape. The structure and operation of a typical conventional machine is described in Korean Patent Registration No. 10-0233335, filed Nov. 20, 1996; and Korean Patent Registration No. 10-388889, filed Apr. 3, 1999. However, the conventional folding machine 1 shown in FIG. 1 can be used mostly for folding flat strip or rule. Thus, to fold a strip or rule of other shapes, a new design is desirable.

SUMMARY

Certain embodiments as disclosed herein provide methods, apparatus, and computer programs for cutting profiles. In some embodiments, methods, apparatus, and computer programs described herein provide for cutting and folding profiles to make channel letters for a sign board.

In one aspect, an apparatus for cutting a profile is disclosed. The apparatus including: a cutter configured to make cuts on the profile having a first surface and a second surface, and having at least one rib on the first surface, wherein the cuts are made on the first surface of the profile; a first drive unit to drive the cutter forward and backward to and from the first surface of the profile; and a second drive unit to drive the cutter up and down along the first surface of the profile.

In another aspect, a folding machine for cutting and folding profiles to make channel letters for a sign board is disclosed. The folding machine including: a profile supply unit configured to feed a profile into the folding machine; a profile feeding path coupled to the profile supply unit, and configured to guide the profile for cutting; a cutting unit coupled to the profile feeding path, the cutting unit comprising: a cutter configured to make cuts on the profile having a first surface and a second surface, and having at least one rib on the first surface, wherein the cuts are made on the first surface of the profile; a first drive unit to drive the cutter forward and backward to and from the first surface of the profile; a second drive unit to drive the cutter up and down along the first surface of the profile; a folding unit configured to fold the profile that is properly cut into a channel letter.

In another aspect, a method for cutting a profile is disclosed. The method including: determining a cut depth of a cut to be made with a cutter on the profile; appropriately selecting and engaging a stopper to allow the cutter to receive and cut the profile; first moving the cutter forward for first cutting and/or backward for repositioning; second moving the cutter down and/or up for second cutting or repositioning; repeating first moving and second moving according to a desired number of cuts.

In yet another aspect, a computer-readable storage medium storing a computer program for cutting a profile is disclosed. The computer the program including executable instructions that cause a computer to: determine a cut depth of a cut to be made with a cutter on the profile; appropriately select and engage a stopper to allow the cutter to receive and cut the profile; first move the cutter forward for first cutting and/or backward for repositioning; second move the cutter down and/or up for second cutting or repositioning; repeat the first move and the second move according to a desired number of cuts.

Other features and advantages of the present invention will become more readily apparent to those of ordinary skill in the art after reviewing the following detailed description and accompanying drawings.

BRIEF DESCRIPTION OF THE DRAWINGS

The details of the present disclosure, both as to its structure and operation, may be gleaned in part by study of the accompanying drawings.

DETAILED DESCRIPTION

Certain embodiments as disclosed herein provide methods and apparatus for cutting profiles. In some embodiments, methods and apparatus described herein provide for cutting and folding profiles to make channel letters for a sign board. References will be made in detail to these embodiments including examples illustrated in the accompanying drawings. Technical structure and operation of the device will be described with reference to the drawings in FIGS. 2 through 11.

As described above, conventional folding machines have structural difficulties in folding metal rules (or strips) of shapes that are not flat. For example, the conventional folding machine shown in FIG. 1 would have difficulty folding metal rule 110 that has protruding ribs or tabs 110*a* and 110*b*, which protrude out of one side of the metal rule at top and bottom ends, as shown in FIG. 2, for example.

Figure 2:
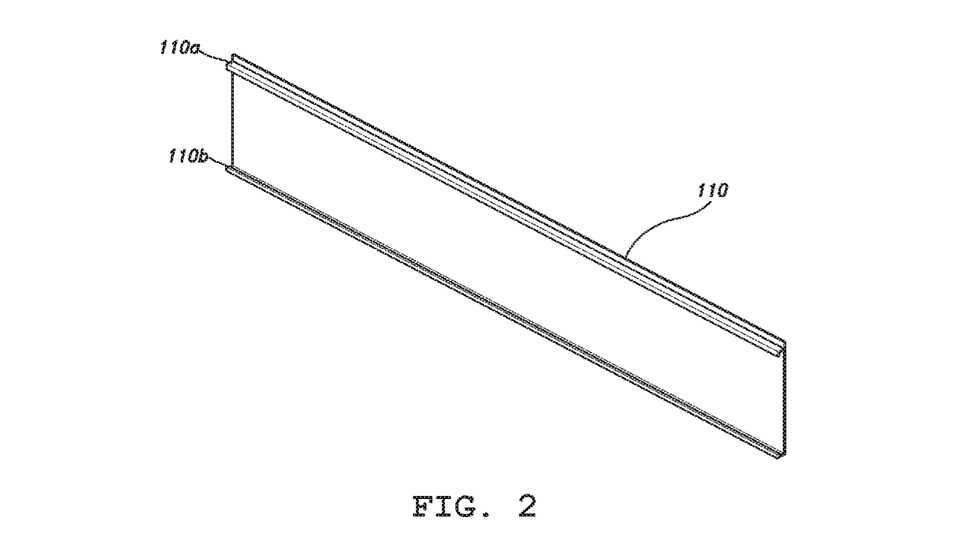
FIG. 2 illustrates a profile including protruding ribs.

In some embodiments, the metal rule (or other rigid material) of the shape illustrated in FIG. 2 can be used to make channel letters for sign boards. In sign board applications, the material that is used to make channel letters, as shown in FIG. 2, is sometimes referred to as "profile". Further, the profile is usually made of metallic material but can be made of aluminum, other rigid/semi-rigid material, or combination of both. Accordingly, the term "profile" is used throughout this disclosure to mean board or strip having ribs or tabs, and is made of metallic and/or other rigid/semi-rigid material.

In one embodiment, the protruding rib 110*b* that protrudes out at the bottom end is used to insert or place a front panel once the metal rule 110 has been folded into a desired shape or letter. The protruding rib 110*a* that protrudes out at the top end can be used to insert or place a back panel once the metal rule 110 has been folded into a desired shape or letter.

Figure 3:
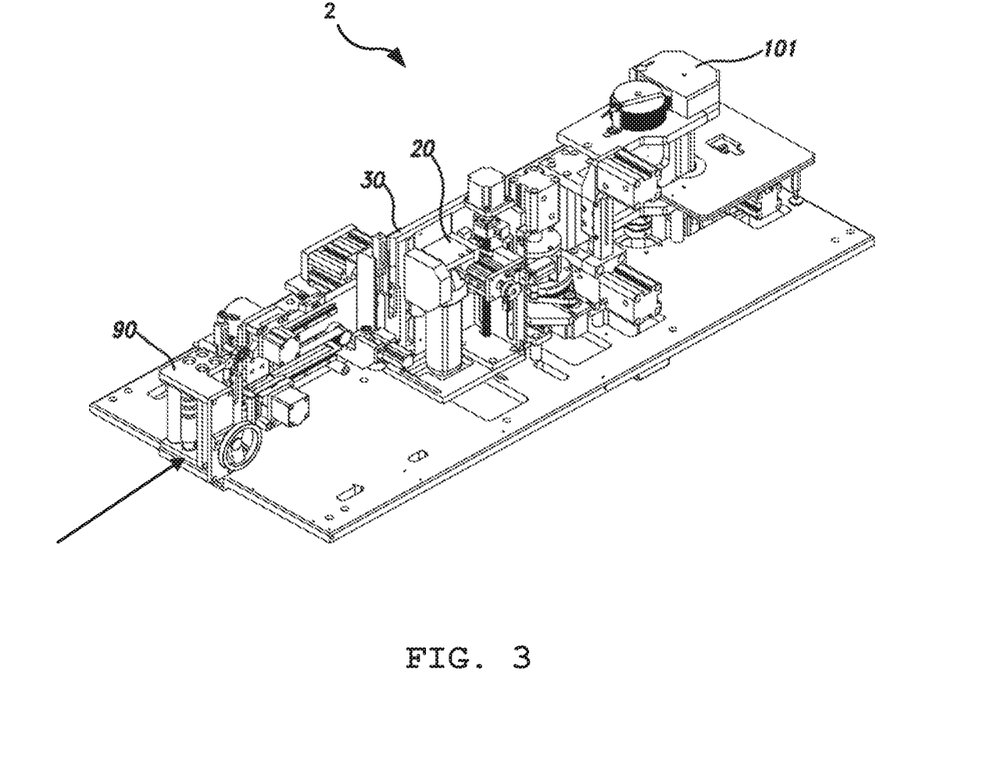
FIG. 3 illustrates a folding machine including a profile supply unit, a profile feeding path, a cutting unit, and a profile folding unit in accordance with one embodiment of the present invention.

FIG. 3 illustrates a folding machine 2 including a profile supply unit 90, a profile feeding path 30, a cutting unit 20, and a profile folding unit 101 in accordance with one embodiment of the present invention. The cutting unit 20 is provided near the profile feeding path 30 to cut a portion of the protruding ribs 110*a* and 110*b* in an angle to facilitate folding of the profile. The folding machine 2 of FIG. 3 is configured to fold the profile having protruding ribs 110*a* and 110*b* protruding out of one side of the metal rule at top and bottom ends, as shown in FIG. 2.

Figure 4:
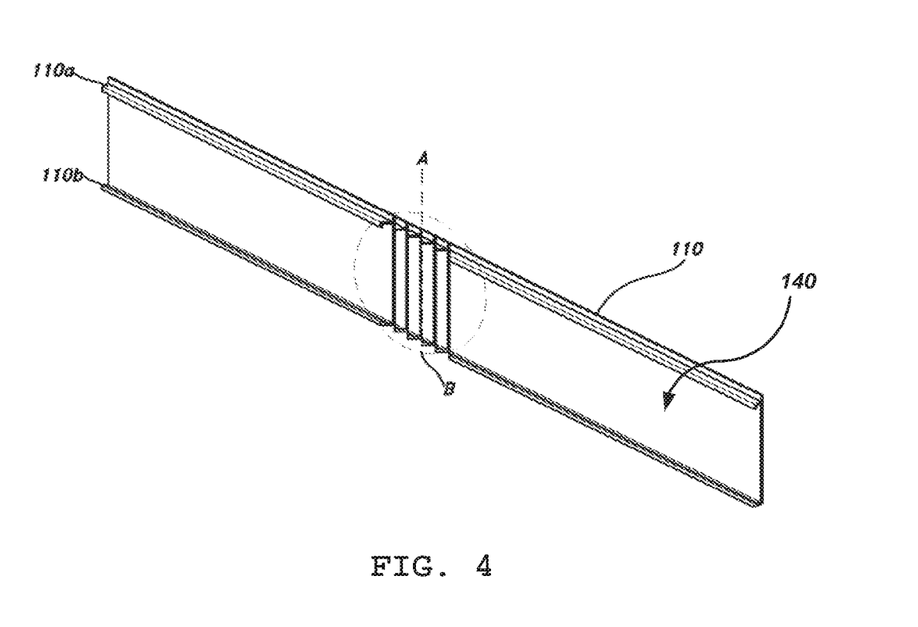
FIG. 4 shows the profile with a portion (see Part B) of protruding ribs cut in a predetermined shape on both sides of the folding line (see Line A)

To describe the cutting and folding process in detail, FIG. 4, for example, shows a profile 110 having protruding ribs 110*a* and 110*b*. This profile 110 is fed into the folding machine 2 through a profile supply unit 90, and is transferred through the profile feeding path 30 in the direction shown in FIG. 3. While the profile 110 is being transferred through the profile feeding path 30, a portion of the protruding ribs 110*a* and 110*b* is cut in an angle by the cutting unit 20 to facilitate the folding of the profile 110. Once the profile 110 is properly cut by the cutting unit 20, the profile folding unit 101 folds the cut profile 110.

FIG. 4 shows the portion (see Part B) of the protruding ribs 110*a* and 110*b* cut in a predetermined shape on both sides of the folding line (see Line A). Thus, in the illustrated embodiment of FIG. 4, in anticipation of the profile 110 being folded along Line A, the cutting unit 20 provides two "V" cuts on each side of Line A and one "V" cut centered at Line A, for a total of five "V" cuts. Although cuts in this embodiment are described as five "V" cuts, any shape and/or any number of cuts can be made on the ribs to facilitate the folding process. For example, five "V" cuts can provide easy folding of the profile 110 into approximately 300-degree angle (see angle C in FIG. 5). However, less or more number of cuts can provide easy folding of the profile 110 into angles less than or greater than 300 degrees. Further, the cut shape can be made in "U" shape or any other appropriate shape rather than a "V" shape. In other embodiments, the size of the V cut can be controlled to determine the angle of the fold.

Figure 4A:
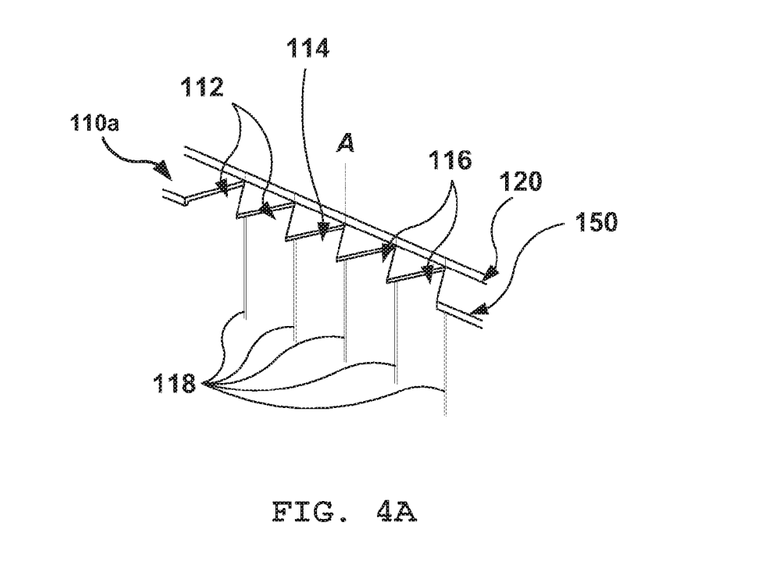
FIG. 4A shows Part B of FIG. 4 in more detail.

To further describe the cutting process in detail, the cutting portion (Part B) of the profile 110 is shown in detail in FIG. 4A. In the illustrated embodiment of FIG. 4A, when it is desired to fold the profile 110 along Line A, two cuts 112 are made on the left side of Line A. Another cut 114 is made centered at Line A. Then, two more cuts 116 are made on the right side of Line A, as shown. In some embodiments, scratch lines or cut lines 118 are made along the center of the cuts 112, 114, 116 to further facilitate the folding of the profile 110. The scratch lines 118 are made carefully on the same side of the profile as the protruding ribs 110*a* and 110*b* so that profile 110 can be folded along those lines without cutting the profile 110 at those lines. Seen in detail in FIG. 4A, the scratch lines 118 make tiny ridges on the surface of the profile 110. In one example, the depth of the ridges made by the scratch lines 118 is approximately one-third of the thickness of the profile. This leaves approximately two-thirds of the thickness of the profile for easier folding with completely cutting the profile. Further, in the illustrated embodiment of FIG. 4A, the V cuts are made on both ribs 110*a* and 110*b* so that the tip of the V shape cuts from the open edge 150 all the way to the closed edge 120 of the ribs 110*a* and 110*b*, and can penetrate slightly further into the profile to match with the tiny ridges made by the scratch lines 118. Generally, the cuts made on the rib are angled so that the open edge 150 has a larger angle than the closed edge 120.

Figure 5:
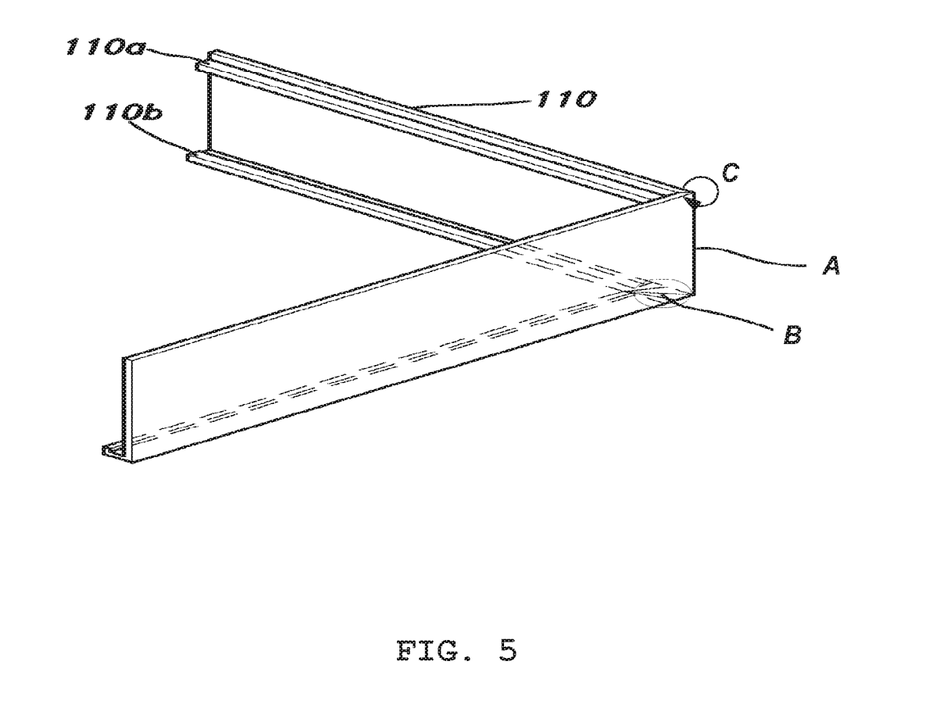
FIG. 5 shows one example of a desired fold shape of the profile after being cut in the cutting process described with respect to FIG. 4 and FIG. 4A, and folded along Line A for angle C.

FIG. 5 shows one example of the desired fold shape of the profile 110 after being cut in the cutting process described above with respect to FIG. 4 and FIG. 4A, and folded along Line A for angle C. Thus, the illustrated embodiment of FIG. 5 shows that the profile 110 can be easily folded into a desired angle because of the cuts made in the ribs 110*a* and 110*b* and the surface of the profile 110. Thus, it can be seen that by making different angle cuts on the ribs 110*a* and 110*b* and the scratch lines 118 on the surface 140 of the profile 110, any shape of channel letters can be easily produced using profiles.

Figure 6:
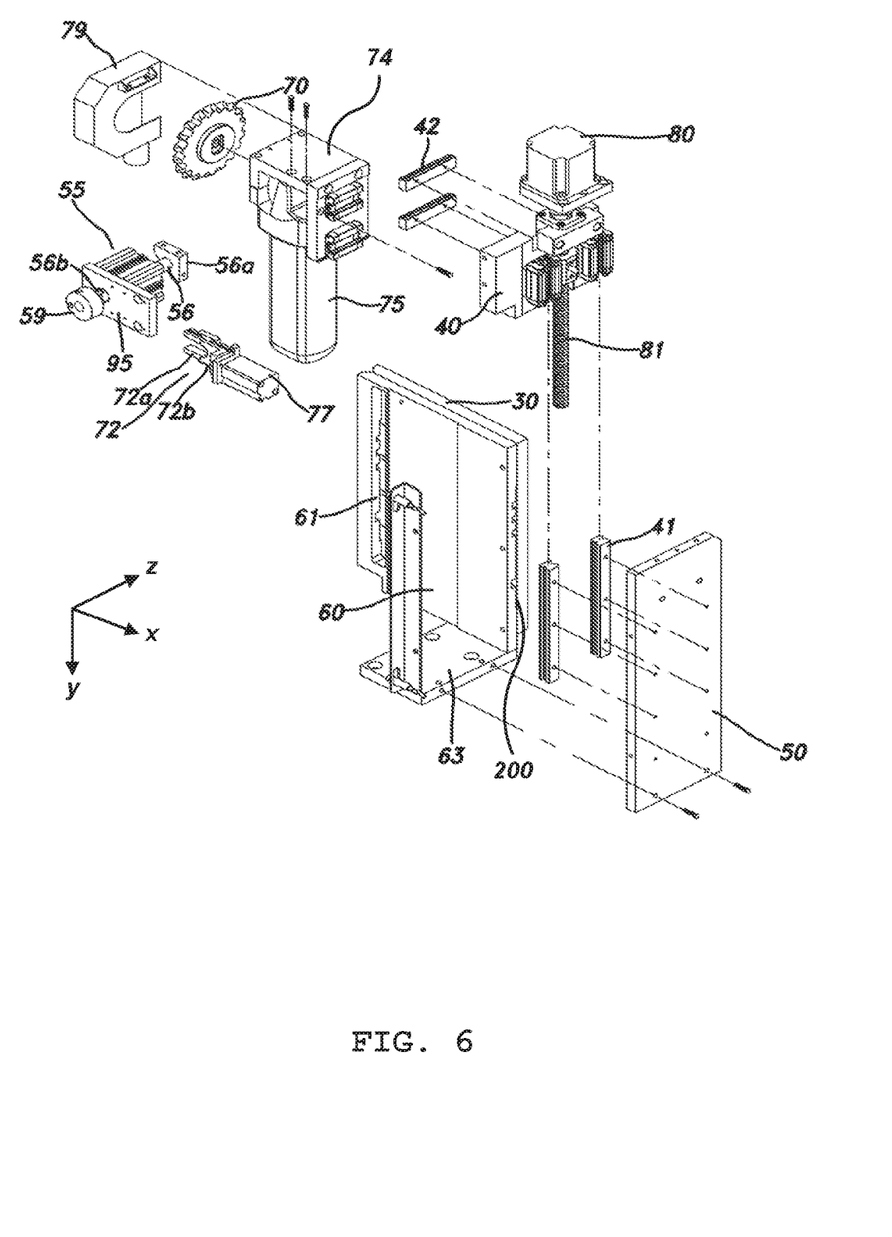
FIG. 6 shows an exploded view of the cutting unit in accordance with one embodiment of the present invention.
Figure 7:
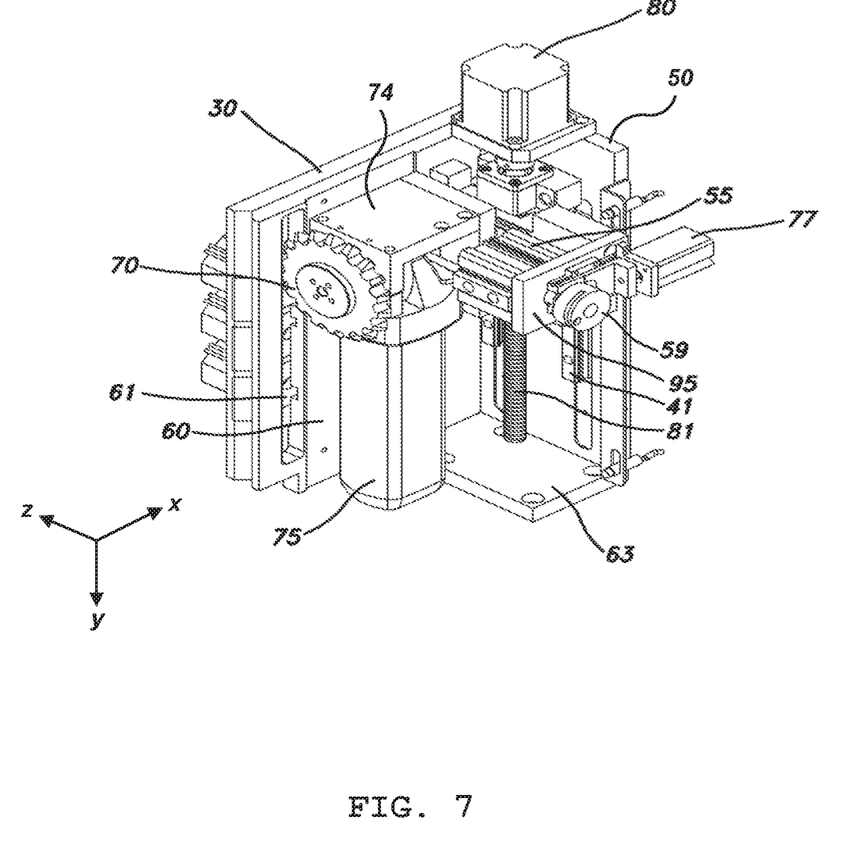
FIG. 7 shows a perspective view of the cutting unit with a cutter in an engaged position.
Figure 8:
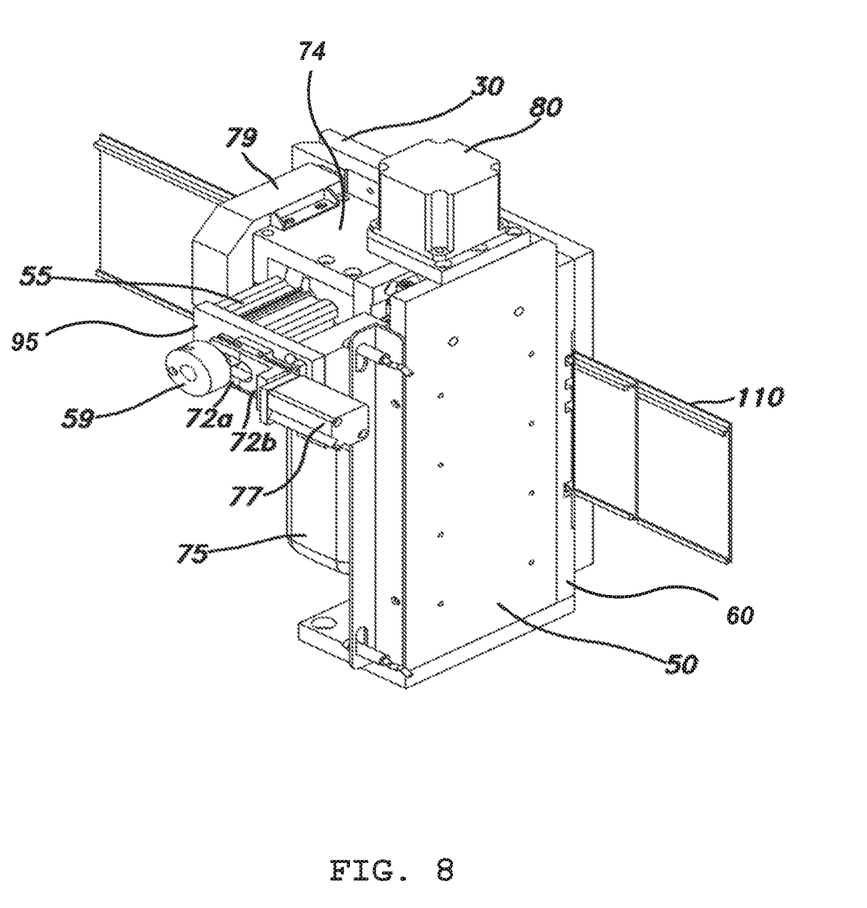
FIG. 8 shows another perspective view of the cutting unit with a cover over the cutter and a profile in position for cutting.

FIG. 6 shows an exploded view of the cutting unit 20 in accordance with one embodiment of the present invention. FIG. 7 shows a perspective view of the cutting unit 20 with a cutter 70 in an engaged position. FIG. 8 shows another perspective view of the cutting unit 20 with a cover 79 over the cutter 70 and a profile 110 in position for cutting.

In the illustrated embodiment of FIG. 6 through FIG. 8, the cutting unit 20 includes a frame 60 coupled to the profile feeding path 30, wherein the frame 60 and the profile feeding path 30 form a slit 200 through which a profile with protruding ribs can be fed. The cutting unit 20 also includes a fixing plate 50 which forms a plate for attaching other parts of the cutting unit 20. Also, a bottom plate 63 is fixed to the bottom end of the fixing plate 50. The frame 60 is provided with an opening 61 to allow a cutter 70 to move forward and backward (along Z axis) through the opening 61 to make cuts (similar to cuts 112, 114, 116) in the ribs 110*a* and 110*b* of a profile 110. The shape of the opening 61 also allows the cutter 70 to move up and down (along Y axis) to make scratch lines (similar to scratch lines 118). However, it is understood that the cutter movement forward and backward along Z axis can provide cuts in the ribs or make scratch line, and that the cutter movement up and down along Y axis can also provide cuts in the ribs or make scratch lines. In the illustrated embodiment of FIG. 6 through FIG. 8, the shape of the cutter 70 is configured so that it makes a V-shape cut in the ribs. However, cutters of other shapes can be configured to cut other shapes such as a U-shape cut.

In the illustrated embodiment of FIG. 6 through FIG. 8, a Y-axis slide rail 41 is provided on the fixing plate 50 along the Y-axis direction, and a moving plate 40 is attached to the Y-axis slide rail 41, which moves the moving plate 40 up and down along Y-axis. A screw driving motor 80 is coupled to the moving plate 40 to drive a vertical axis screw 81 which is threaded into the moving plate 40. Thus, the vertical axis screw 81 is rotated by the driving motor 80 in a direction parallel to the Y-axis slide rail 41. The lower end of the vertical axis screw 81 is configured to rest on top of the bottom plate 63. Since the screw driving motor 80 and the vertical axis screw 81 are coupled to the moving plate 40, as described above, the screw driving motor 80 drives the moving plate 40 up and down along the Y-axis direction parallel to the Y-axis slide rail 41.

The cutting unit 20 also includes a cutter driving motor 75, a Z-axis slide rail 42, a first cylinder 55, a support member 95, a bi-directional rod 56, a securing wheel 59, a stopper 72, and a second cylinder 77. The cutter driving motor 75 drives the cutter 70, and is fixed to the sidewall of the moving plate 40 using the Z-axis slide rail 42. Thus, the Z-axis slide rail 42 allows the first cylinder 55 to drive the cutter driving motor 75 forward and backward along the Z-axis direction. The first cylinder 55 is coupled to the support member 95, which is in turn coupled to one side of the moving plate 40. The first cylinder 55 drives the bi-directional rod 56 through its opening to move the cutter driving motor 75 along the Z-axis direction. The rod 56 includes an inner rod 56a and an outer rod 56b, which are formed as a single body. The inner rod 56a is coupled to the cutter driving motor 75, while the outer rod 56b passes through the support member 95 and is coupled to the securing wheel 59. The stopper 72 is designed to provide a multi-level depth control in such a way that the movement of the cutter driving motor 75 along the Z-axis direction can be controlled. In the illustrated embodiment of FIG. 6 through FIG. 8, the stopper 72 is designed for only two depth levels between the securing wheel 59 and the support member 95. The stopper 72 is connected to a rod of the second cylinder 77, and is fixed to one side of the support member 95.

In the illustrated embodiment of FIG. 6 through FIG. 8, the cutter 70 is also coupled to the cutter driving motor 75 through a cutter axis rod 73. The cutter 70 is configured to be driven by the cutter driving motor 75 which rotates the cutter 70 using the cutter axis rod 73. A cover 79 partially covers the cutter 73, wherein uncovered side of the cutter 73 is configured to face the profile 110 through the opening 61 for cutting the profile. The cover 79 is fixed to the body 74 of the cutter driving motor 75.

Elements of the cutting unit 20 described in FIG. 6 through FIG. 8 can be assigned as follows in a general description: a cutting apparatus 20 for cutting a profile, including: a cutter 70 configured to make cuts on the profile 110, wherein the profile 110 has a first surface 140 and a second surface, the profile 110 has at least one rib 110a and 110b on the first surface 140, and the cuts are made on the first surface 140; a first drive unit 55, 56, 42, 59, 77, 72 to drive the cutter 70 forward and backward to and from the first surface 140 of the profile 110; and a second drive unit 80, 81, 40, 41 to drive the cutter 70 up and down on the first surface 140 of the profile 110.

Figure 9:
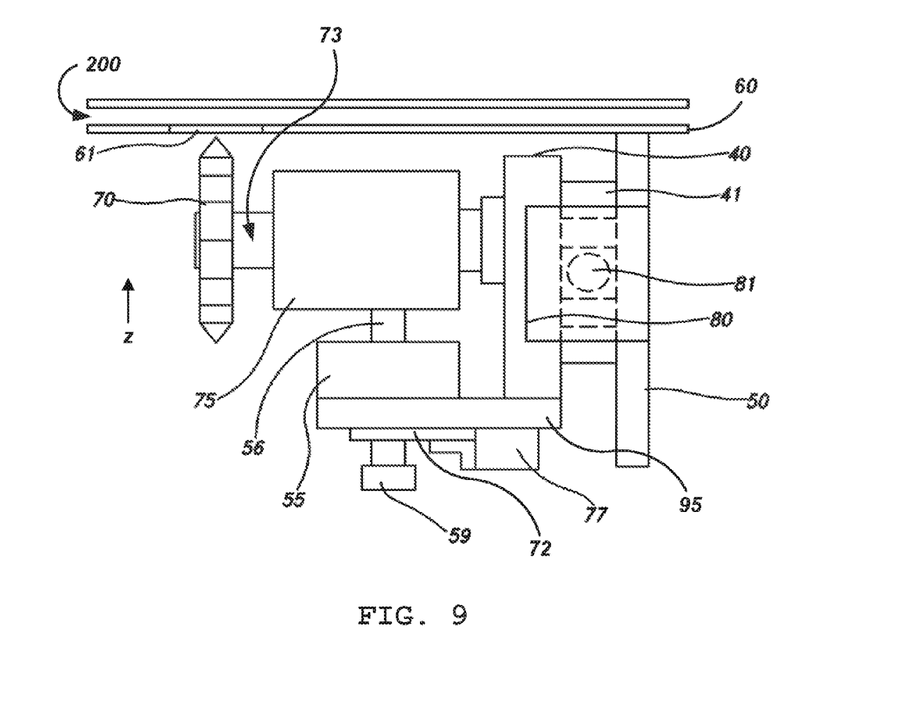
FIG. 9 shows the cutting unit prior to engaging the profile for cutting.
Figure 10:
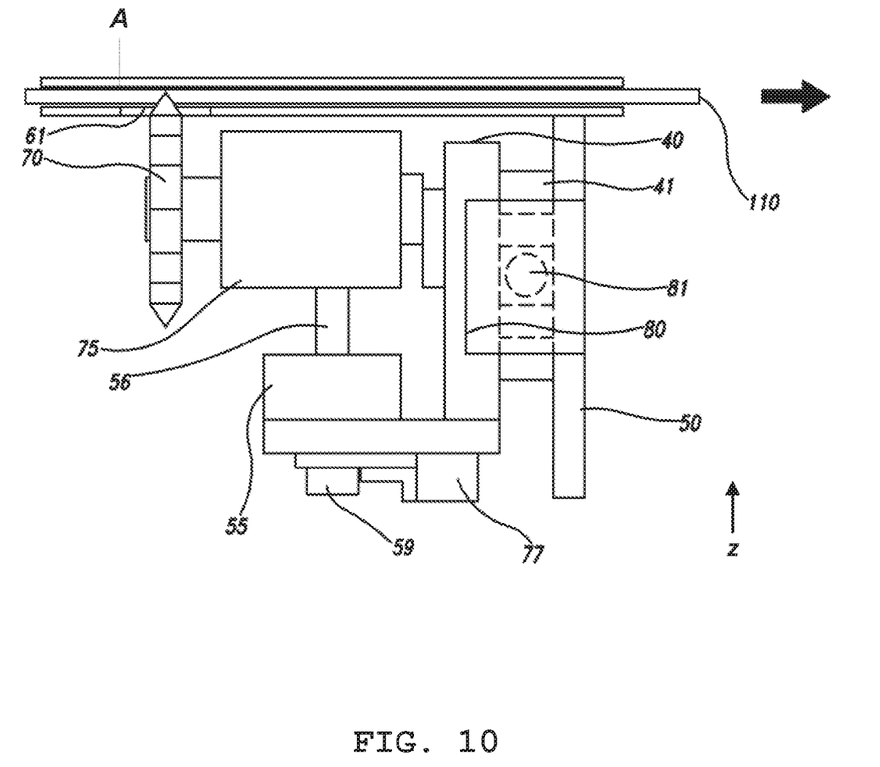
FIG. 10 shows the cutting unit in an engaged position for cutting the profile.
Figure 11:
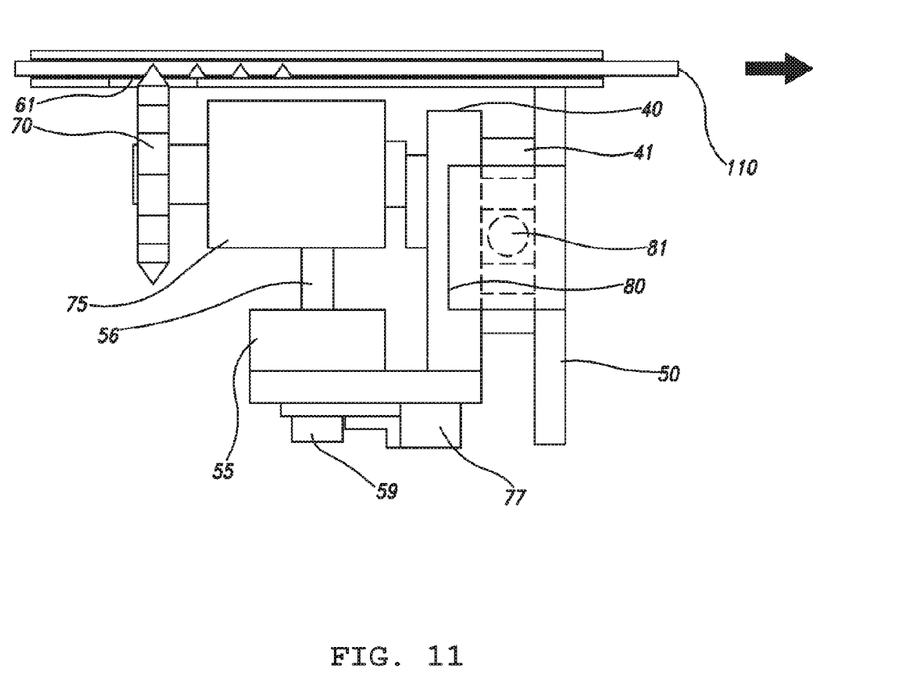
FIG. 11 shows the cutting unit in another engaged position for cutting the profile, wherein the profile is moved at a predetermined interval.

FIG. 9 through FIG. 11 illustrate a process of cutting the profile in accordance with one embodiment of the present invention. FIG. 9 shows the cutting unit 20 prior to engaging the profile for cutting. FIG. 10 shows the cutting unit 20 in an engaged position for cutting the profile 110. FIG. 11 shows the cutting unit 20 in another engaged position for cutting the profile 110, wherein the profile 110 is moved at a predetermined interval.

Figure 9A:
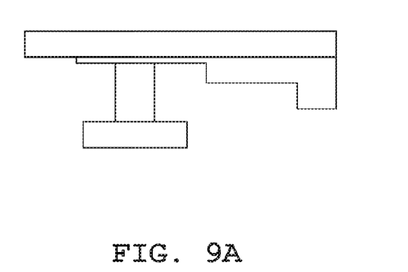
FIG. 9A shows thin front end of a stopper positioned between a securing wheel and a support member.
Figure 9B:
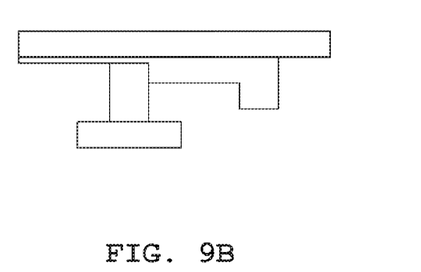
FIG. 9B shows thick rear end of a stopper positioned between a securing wheel and a support member.

At the initial stage of the cutting process (as shown in FIG. 9), the depth of a cut to be made on the ribs of the profiles is determined. Once the cutting depth is determined, the distance by which the cutter driving motor 75, and hence the cutter 70, is to be moved forward in the Z-axis direction can be set by the positioning of the stopper 72 between the securing wheel 59 and the support member 95. For example, if the cutting depth to be made on the profile 110 is set as a deep cut, then a second cylinder 77 is driven so that a thin front end 72a of the stopper 72 is positioned between the securing wheel 59 and the support member 95 (see FIG. 9A) so that the cutter 70 can be moved forward deeply into the profile along the Z-axis direction. However, if the cutting depth to be made on the profile 110 is set as a shallow cut, then a second cylinder 77 is driven so that a thick rear end 72b of the stopper 72 is positioned between the securing wheel 59 and the support member 95 (see FIG. 9B) so that the cutter 70 can be moved forward less than when the thin front end 72a is used. When moving the stopper 72 between positions shown in FIG. 9A and FIG. 9B, the second cylinder 77 should be driven only during a state where the cylinder rod 56 connected to the cutter driving motor 75 is moved in a direction opposite the Z-axis direction (i.e., the negative-Z direction) so that there is enough space along the cylinder rod 56 between the securing wheel 59 and the support member 95 for the stopper 72 to be moved in.

Once the cutting depth has been determined and an appropriate stopper 72 has been selected and engaged, the profile 110 is then fed through the slit 200 until Line A (see FIG. 4) reaches a predetermined point near the opening 61, as shown in FIG. 10. Once the profile 110 has reached and come to a rest at an initial cutting position, the first cylinder 55 is driven to push the rod 56 toward the profile feeding path 30, thereby moving the cutter driving motor 75 and, in turn, the cutter 70 forward in the Z-axis direction. The cutter 70 is then rotated and moved through the opening 61 to cut into the profile 110 for a predetermined cutting depth. If the cutter 70 is initially positioned at the top end of the profile 110 to make a cut at the top of the profile 110, then the screw driving motor 80 can now drive the moving plate 40 down along the Y-axis direction to move the cutter 70 down with it to make the scratch line 118 on the inside surface 140 of the profile 110 and the V cuts in the top rib 110a and the bottom rib 110b of the profile 110. When a cut along the first line (along the Y-axis direction) is completed, the cutter 70 returns to its original position as illustrated in FIG. 9. The profile 110 is moved at a predetermined interval as illustrated in FIG. 11.

In an alternative embodiment, the cutter 70 is initially positioned at the bottom end of the profile 110 to make a cut at the bottom of the profile 110, then the screw driving motor 80 now drives the moving plate 40 up along the Y-axis direction to move the cutter 70 up with it to make the scratch line 118 on the inside surface 140 of the profile 110 and the V cuts in the bottom rib 110b and the top rib 110a of the profile 110. Other embodiments with different orders for the above-described steps are also contemplated.

The above-described process can be summarized generally as follows: determining a cut depth of a cut to be made with a cutter on the profile; appropriately selecting and engaging a stopper to allow the cutter to cut the profile; receiving the profile for cutting; first moving the cutter forward for first cutting and/or backward for repositioning; second moving the cutter down and/or up for second cutting or repositioning; and repeating first moving and second moving according to a desired number of cuts.

Figure 12:
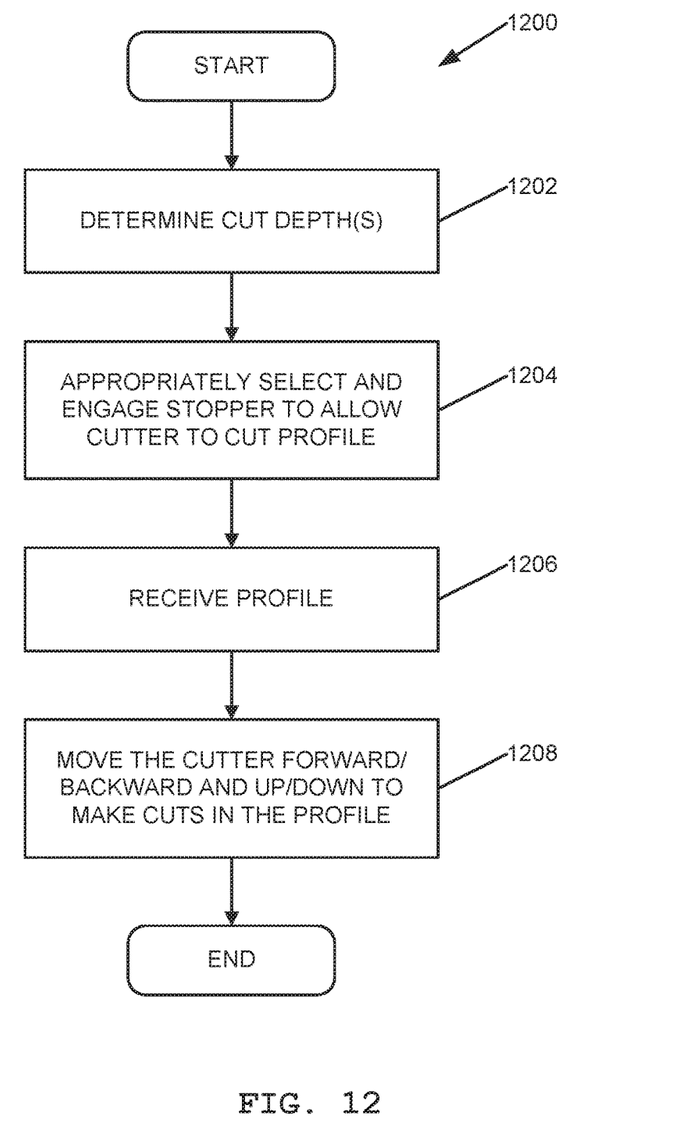
FIG. 12 is a flowchart illustrating a process of cutting the profile in accordance with one embodiment of the present invention.

FIG. 12 is a flowchart illustrating a process of cutting the profile in accordance with one embodiment of the present invention. At the initial stage of the cutting process, the depth of a cut to be made on the ribs of the profiles is determined (see Box 1202). Once the cutting depth is determined, the distance by which the cutter driving motor 75, and hence the cutter 70, is to be moved forward in the Z-axis direction can be set by the positioning of the stopper 72 between the securing wheel 59 and the support member 95, at Box 1204. Once the cutting depth has been determined and an appropriate stopper 72 has been selected and engaged, the profile 110 is then fed through the slit 200, at Box 1206, until Line A reaches a predetermined point near the opening 61.

Once the profile 110 has reached and come to a rest at an initial cutting position, the first cylinder 55 is driven to push the rod 56 toward the profile feeding path 30, thereby moving the cutter driving motor 75 and, in turn, the cutter 70 forward in the Z-axis direction, at Box 1208. The cutter 70 is then rotated and moved through the opening 61 to cut into the profile 110 for a predetermined cutting depth.

The foregoing embodiments are merely presented as examples and are not to be construed as limiting the present invention. The present teachings can be readily applied to other types of methods, apparatus and/or devices. In other embodiments, the teachings embodied in the method(s) can also be implemented as computer programs stored in storage medium. The description of the present invention is intended to be illustrative, and not to limit the scope of the claims. Many alternatives, modifications, and variations will be apparent to those skilled in the art.

What is claimed is:

1. A method for making cuts on a first surface of a profile to enable folding of the profile to make a channel letter, the method comprising:

determining positions of the cuts to be made on the first surface of the profile, wherein the positions of the cuts are determined along a longitudinal axis of the profile such that the cuts are appropriate for making curvatures of the channel letter;

feeding the profile into a folding machine along the longitudinal axis; and making the cuts at the determined positions on the first surface of the profile in a transverse direction to the longitudinal axis by driving a cutter toward the first surface of the profile and moving the cutter in the transverse direction on the first surface of the profile, wherein making the cuts on the first surface includes making a first cut at a center line along the transverse direction, and making at least one additional cut along the transverse direction on either side of the center line and the at least one additional cut having a cut depth into the first surface along an entire width of the profile, wherein the center line is a first line about which the profile is to be folded centered at the first line, wherein the first cut and the at least one additional cut are cuts for one fold of the profile of a particular angle made at the center line.

2. The method of claim 1, wherein the profile also comprises at least one rib disposed on the first surface.

3. The method of claim 2, wherein making the cuts on the first surface of the profile also comprises making cuts to the at least one rib disposed on the first surface.

4. The method of claim 3, wherein the cuts made to the at least one rib are v-cuts.

5. The method of claim 1, wherein moving the cutter in the transverse direction on the first surface of the profile comprises moving the cutter up and down in the transverse direction.

* * * * *